United States Patent [19]

Richardson

[11] Patent Number: 5,655,631

[45] Date of Patent: Aug. 12, 1997

[54] ADJUSTABLE CHOCK FOR RADIO-CONTROLLED MODEL AIRPLANES

[76] Inventor: Daniel B. Richardson, 2149 Hallmark Dr., Gambrills, Md. 21054

[21] Appl. No.: 399,529

[22] Filed: Mar. 7, 1995

[51] Int. Cl.$^6$ .............................. B60T 3/00; A63H 27/00
[52] U.S. Cl. .................... 188/32; 244/110 R; 446/34
[58] Field of Search .............................. 446/34, 63, 429; 188/32, 36; 244/110 R, 110 A

[56] References Cited

U.S. PATENT DOCUMENTS

| | | | |
|---|---|---|---|
| 1,776,935 | 1/1930 | Snyder | 410/30 |
| 1,803,942 | 5/1931 | Lunati | 188/32 |
| 2,011,469 | 8/1935 | Brueggemann | 188/32 |
| 2,835,349 | 5/1958 | Veselik et al. | 188/32 |
| 3,189,127 | 6/1965 | Karnow | 188/32 |
| 4,031,726 | 6/1977 | De Jager | 188/32 X |
| 4,476,961 | 10/1984 | Luigi | 188/32 |
| 4,711,325 | 12/1987 | Mountz | 188/32 |
| 4,993,672 | 2/1991 | Hosage | 446/34 X |
| 5,028,015 | 7/1991 | Moses et el. | 244/63 |
| 5,199,668 | 4/1993 | Swaney, Jr. | 446/429 X |
| 5,490,582 | 2/1996 | Trowbridge | 188/32 X |

FOREIGN PATENT DOCUMENTS 40974  12/1915  Sweden ................... 188/32

Primary Examiner—Mickey Yu

[57] ABSTRACT

An adjustable chock for radio-controlled model airplanes, having two affixed restraining members that can adjustably seat against the front and rear side of model airplanes landing gear, thus preventing its unintentional movement.

17 Claims, 3 Drawing Sheets

ADJUSTABLE CHOCK FOR RADIO-CONTROLLED MODEL AIRPLANES

BACKGROUND

1. Field of Invention

This invention relates to radio-controlled model airplanes. It provides a safe and convenient way for the average model airplane pilot to restrain the movement of his model airplane while it's under power.

2. Description of Prior Art

The flying of radio-controlled model airplanes has gotten increasingly popular in the United States. With modelers as young as 10 years old and with more powerful engines turning propellers in excess of 12,000 rpm, the need for increased safety in this hobby has never been more apparent.

There are several types of safety devices used by radio-controlled model airplane pilots that prevent the model airplane from moving while it's under power. These include: Hosage, 1991, U.S. Pat. No. 4,993,672; Moses, 1991, U.S. Pat. No. 5,028,015; Swaney, Jr., 1993, U.S. Pat. No. 5,199,668. Even though they will all restrain a model airplane while it's under power, these designs have a major limitation. Due to the fact they are dependent upon spikes driven into the ground to hold them in place, they are only useful on soft ground, such as grass or dirt.

A type of model airplane design currently growing in popularity is one in which the engine is in the back of the model airplane behind the horizontal and vertical stabilizers called a "pusher". The three inventions mentioned above would not be practical with this type of model airplane, because they all use the horizontal stabilizer for restraint. Also, Hosage and Swaney Jr's invention restrain the model airplane by having vertical members rest against the leading edge of the horizontal stabilizer. Four-stroke engines can back-fire and reverse rotation, thus causing the model airplane to go backwards. These two inventions do not prevent backward movement.

Another disadvantage of the above mentioned inventions is they either require welding or soldering for assembly or they contain numerous parts and require a considerable amount of assembly time.

My invention will allow the pilot to safely restrain and control his model airplane at a flying site with a hard surface, such as concrete or asphalt in addition to soft ground as the inventions mentioned above. My invention also restrains the model airplane's movement through its landing gear which is one of the most durable and strongest parts of a model airplane while also providing restraint in the forward and rearward directions. It can also be used with almost every type of model airplane design, including tricycle landing gear, tail-draggers and pusher type aircraft.

As an additional use of this invention, the pilot can use it while transporting his model airplane to and from the flying site. To restrain his model airplane from movement in the bed of a pick-up truck or on the floor of a station wagon or mini-van.

There remained a need for an improved safety restraining device for radio-controlled model airplanes. My invention does improve safety by giving the pilot more flexibility where he can safely restrain his model airplane while it's under power. My invention typically requires two parts, each simple to manufacture and to assemble. With these advantages, it is a device that would be inexpensive and practical for the average radio-controlled model airplane pilot.

DRAWING FIGURES

DESCRIPTION—FIGS. 1 TO 4

Figure 1:
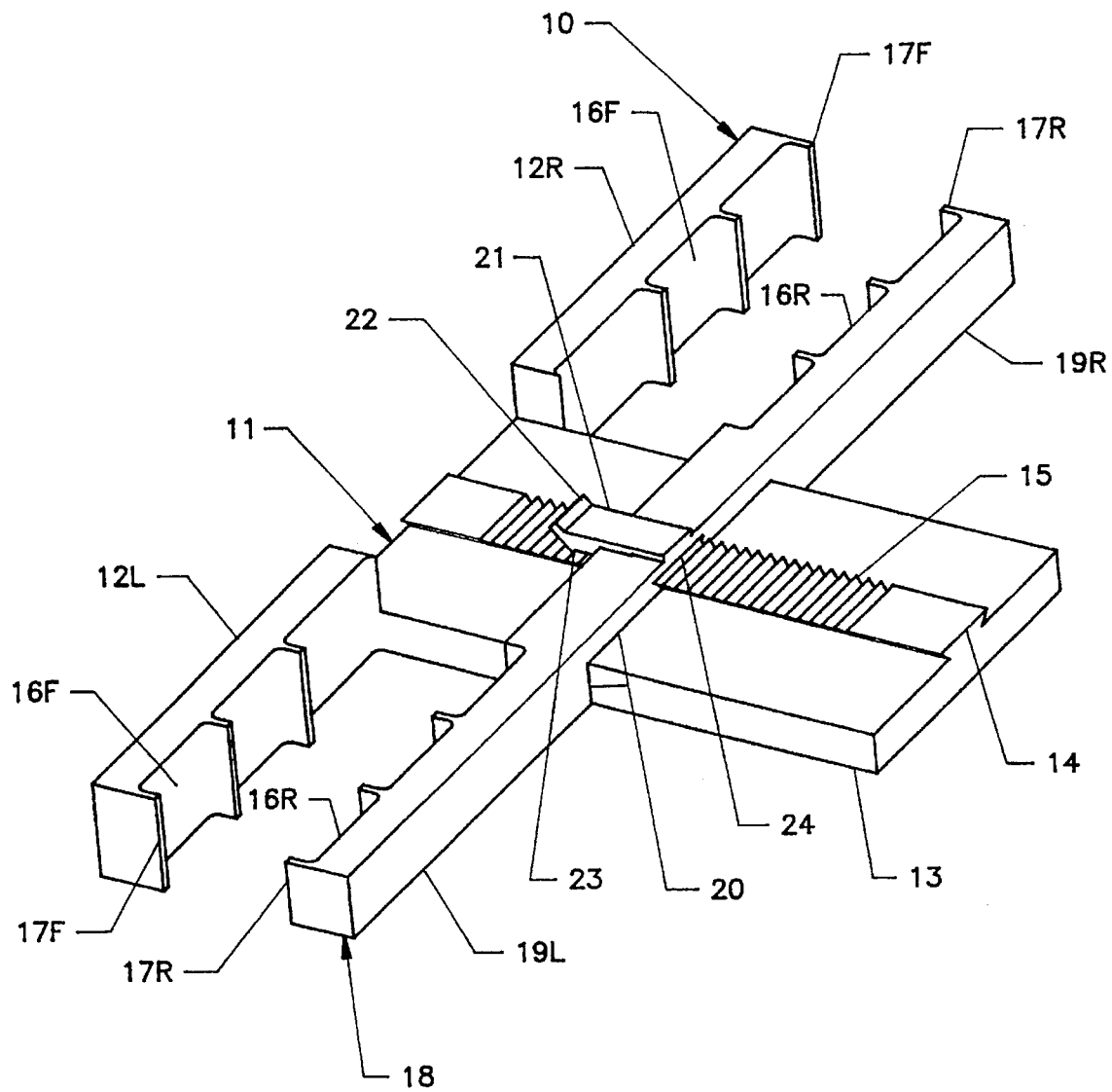
FIG. 1 is an isometric view of a preferred embodiment for this invention.

Unless otherwise specified, refer to FIG. 1. Adjustable chock 10 consists of two parts. A T-shaped stationary base 11 and a adjustable member 18.

Stationary base 11, which can typically be made of molded plastic, consists of a stationary restraining member 12L, 12R and a base member 13. Stationary restraining member 12L and 12R should be of equal length having a inner surfaces 16F include vertical ribs 17F. About the top surface of base member 13 includes a male dovetail element 14. Base member 13, when in combination with restraining members 12L, 12R, 19L and 19R will create maximum friction with the ground 29 when in contact therewith.

Adjustable member 18, which can typically be made of molded plastic, consists of adjustable restraining member 19L, 19R and channel 20. Adjustable restraining member 19L and 19R having a inner surfaces 16R include vertical ribs 17R. Adjustable restraining member 19, inner surfaces 16R and vertical ribs 17R mirror stationary restraining member 12, inner surfaces 16F and vertical ribs 17F with length and vertical ribs 17 locations. Channel 20 includes a female dovetail element 24.

Stationary base 11 and adjustable member 18 assemble at the dovetail elements 14 and 24 and with channel 20 conforming over base member 13. Adjacent the male dovetail element 14 and in alignment therewith is a pawl and ratchet mechanism that includes a locking tooth 23 and a row of angled teeth 15. Locking tooth 23, inclusive of adjustable member 18, includes pull tab 22 and flexible member 21. Flexible member 21 is made to have tension, forcing locking tooth 23 to it's normal "down" position engaging angled teeth 15, as shown in FIG. 2.

Figure 2:
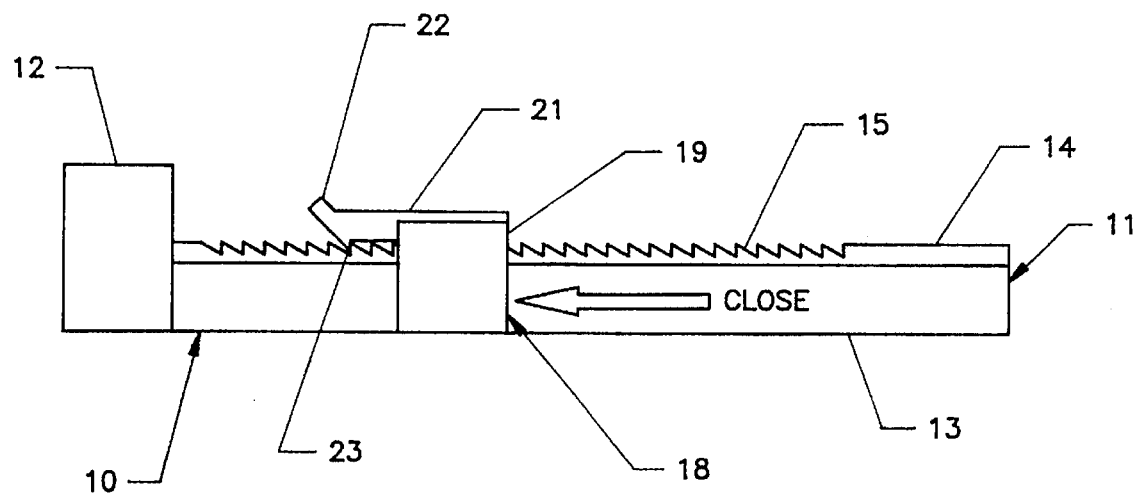
FIG. 2 is a side view showing the locking mechanism.
Figure 3:
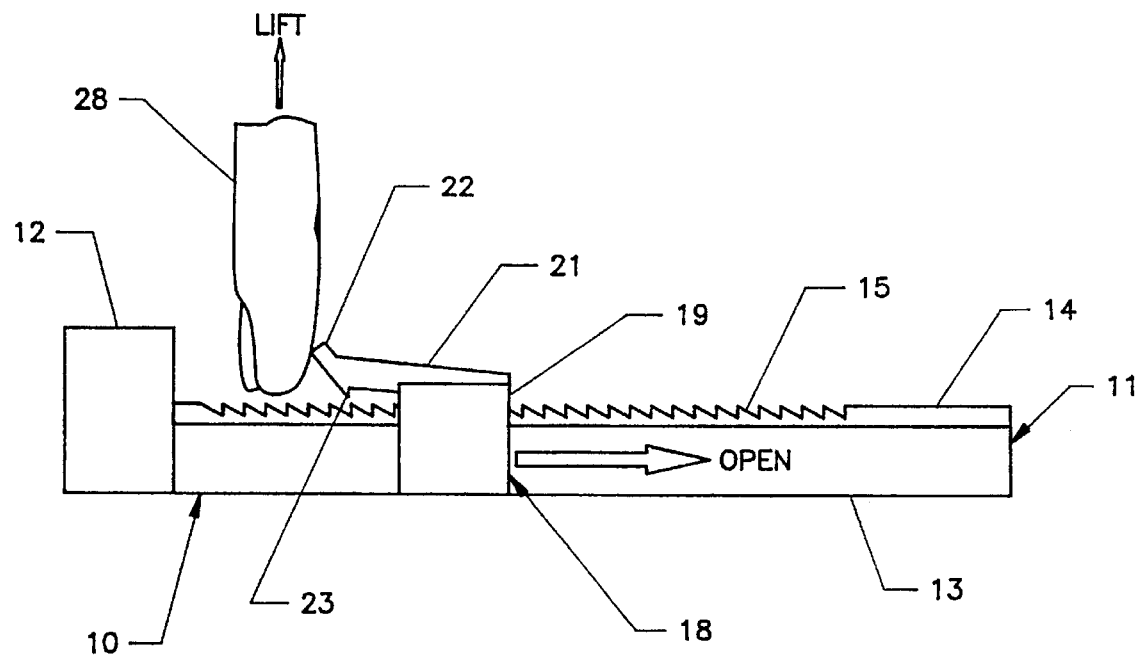
FIG. 3 is a side view showing the locking mechanism disengaged.

As shown in FIG. 2, locking tooth 23 and angled teeth 15 are configured to produce a ratchet so adjustable member 18 can only slide in the closing direction. As shown in FIG. 3, pull tab 22 is positioned upward and at an angle to enable the pilot to grip and lift with finger 28 allowing locking tooth 23 to disengage from angled teeth 15.

OPERATION

Figure 4:
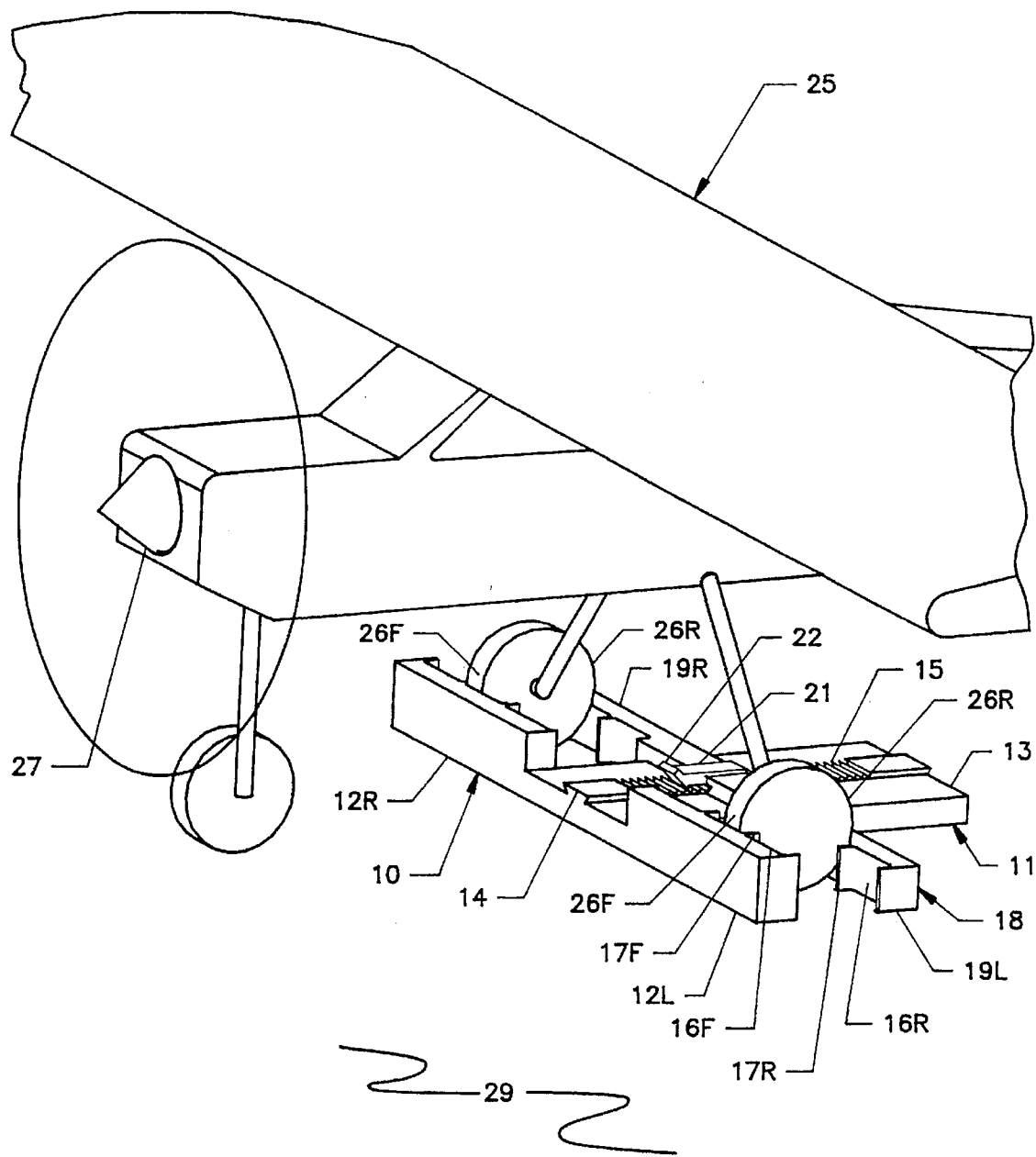
FIG. 4 is an isometric view showing how the adjustable chock is employed.

FIG. 4 shows how adjustable chock 10 is employed. Adjustable chock 10 is placed on ground 29 with adjustable member 18 positioned to accommodate landing gear 26 of model airplane 25. Landing gear 26 of model airplane 25 is placed on ground 29 approximately centered and straddling base member 13 of stationary base 11 and amid the stationary and adjustable restraining members 12 and 19 respectively. Pilot then moves adjustable member 18 in the "close" direction, as shown in FIG. 2, until landing gear rear 26R is positioned adjacent to inner surface 16R and landing gear front 26F comes in contact with inner surface 16F. Vertical ribs 17 will insure landing gear 26 from moving laterally or side to side.

As shown in FIG. 2, adjustable member 18 is prevented from moving in the open direction due to pawl and ratchet mechanism of locking tooth 23 on adjustable member 18 mating with angled teeth 15 on base member 13. The pilot can now safely start engine 27 on model airplane 25 and perform required radio and engine adjustments. When pilot is ready to fly, model airplane 25 is lifted from restraining members 12 and 19. To move adjustable member 18 in the open direction, as shown in FIG. 3, the pilot lifts pull tab 22 with finger 28 disengaging locking tooth 23 from angled teeth 15 allowing adjustable member 18 to freely slide open.

SUMMARY, RAMIFICATIONS AND SCOPE

Accordingly, the reader will see this as:

inexpensive and easy to manufacture, typically made from two molded plastic parts, easy to assemble, by sliding adjustable member on to stationary base at the dovetails, safe and practical, by safely restricting the movement of a model airplane while it's under power, being adjustable, allowing use with all types of model airplanes while also being rugged enough to withstand being stepped on or thrown in a box with the rest of the pilots support gear.

This is a safe and practical invention for the average radio-controlled model airplane pilot. Although the description above contains many specificities, these should not be construed as limiting the scope of the invention but as merely providing illustrations of some of the presently preferred embodiments of this invention. For example, the mating of stationary base 11 and adjustable member 18 can be of different dovetail, tongue and groove or mechanical means as well as a different means for locking adjustable member 18 in place. Soft rubber material on bottom surface of adjustable chock 10 or holes provided in base member 13 allowing pilot to spike adjustable chock 10 to ground 29 can give additional restraining advantages on certain surfaces.

Thus the scope of the invention should be determined by the appended claims and their legal equivalents, rather than by the examples given.

I claim:

1. An adjustable chock for use in preventing movement in radio-controlled model airplanes having at least one landing gear and having front and rear sides of said landing gear rest and be captured between restraining members, comprising:

(a) an elongated base member for supporting said chock on a play surface, (b) two stationary restraining members fixebly attached to said base member, each stationary restraining member being in alignment with the other and each extending laterally and outwardly on each respective side of said base member, (c) an adjustable member, said adjustable member centrally locating said base member and parallel with respect to said stationary restraining members, said adjustable member including two adjustable restraining members in direct opposing relation to respective said stationary restraining members, (d) said stationary and adjustable restraining members have respective opposed inner surfaces and a plurality of corresponding spaced vertical ribs on said inner surfaces to prevent said model airplane landing gears from lateral movement, (e) means for movably attaching said adjustable member to said base member, (f) means for adjusting said adjustable member so as to allow adaptability of said restraining members to a plurality of sizes and types of said model airplane and model airplane landing gear, and (g) a locking means for preventing said adjustable member from unintended movement.

2. The adjustable chock of claim 1 wherein said means for attaching said adjustable member to said base member is an interlocking joint in the form of a dovetail.

3. The adjustable chock of claim 2 wherein said dovetail comprises a grooved channel on said adjustable member and a corresponding wedge on said base member.

4. The adjustable chock of claim 1 wherein said locking means includes a row of angled teeth on said base member and a locking tooth on said adjustable member, said locking tooth mating with said row of angled teeth, said row of angled teeth sloping in one direction such that said adjustable member cannot slide in a direction opposite to that of said stationary restraining members.

5. The adjustable chock of claim 4 wherein said locking tooth has means to lift for disengagement from said row of angled teeth so as to allow said adjustable member to slide in a direction opposite to that of said stationary restraining member.

6. The adjustable chock of claim 5 wherein said means to lift includes a flexible member having a pull tab on said locking tooth.

7. A method for restraining movement of radio-controlled model airplanes of a plurality of sizes and types having left and right landing gears, said landing gears having front and rear sides, comprising:

(a) attaching an elongated adjustable member to a stationary base, said stationary base consisting of an elongated base member and two elongated stationary restraining members, each stationary restraining member being in alignment with the other and extending laterally and outwardly on each side of said base member, said adjustable member centrally locating said base member and parallel with respect to said stationary restraining members, said adjustable member including two adjustable restraining members in direct opposing relation to respective said stationary restraining members, (b) placing said model airplane on the ground so that said front and rear side of said landing gears are positioned adjacent to and amid said stationary restraining members and said adjustable restraining members, said landing gears straddling said base member, (c) adjusting said adjustable member to capture said left and right landing gears between respective said stationary restraining members and said adjustable restraining members, and (d) locking said adjustable member to said base member to prevent unintended movement of said adjustable member during use.

8. The method of claim 7 wherein said adjustable member is attached to said base member solely by dovetailing.

9. The method of claim 7 wherein said landing gear is obstructed from moving side to side.

10. The method of claim 7 wherein said locking said adjustable member to said base member is by use of a ratchet on said base member mating with a pawl on said adjustable member.

11. The method of claim 10 wherein said pawl can be disengaged from said ratchet by elevating said pawl from said ratchet to allow said adjustable member to slide freely in a direction opposite to that of said stationary restraining member.

12. An adjustable chock for use in preventing movement in radio-controlled model airplanes having at least one landing gear, by having front and rear sides of the landing gear rest and be captured between restraining members, comprising:

(a) an elongated base member for supporting said chock on a play surface, (b) two stationary restraining members fixedly attached to said base member, each stationary restraining member being in alignment with the other and each extending laterally and outwardly on each respective side of said base member, (c) an adjustable member, said adjustable member centrally locating said base member and parallel with respect to said stationary restraining members, said adjustable member including two adjustable restraining members in direct opposing relation to respective said stationary restraining members, (d) engaging means for movably engaging said adjustable member to said base member, said engaging means comprising a tongue integral with and extending longitudinally of said base member and a groove formed in said adjustable member, said groove slidably receiving said tongue, and (e) locking means for adjustably locking said adjustable member with said base member, said locking means comprising a ratchet integral with and extending longitudinally of said base member and a cooperating element integral with said adjustable member whereby said ratchet and said cooperating element working together preventing said adjustable member from unintended movement.

13. The adjustable chock of claim 12 wherein said tongue and groove engaging means is in the form of a dovetail.

14. The adjustable chock of claim 12 wherein said restraining members have adjacent inner surfaces and a plurality of corresponding spaced vertical ribs on said inner surfaces to prevent said model airplane landing gear from lateral movement.

15. The adjustable chock of claim 12 wherein said locking means includes a row of angled teeth on said base member and a locking tooth on said adjustable member, said locking tooth mating with said row of angled teeth, said row of angled teeth sloping in one direction such that said adjustable member cannot slide in a direction opposite to that of said stationary restraining member.

16. The adjustable chock of claim 15 wherein said locking tooth has means to lift for disengagement from said row of angled teeth so as to allow said adjustable member to slide in a direction opposite to that of said stationary restraining member.

17. The adjustable chock of claim 16 wherein said means to lift includes a flexible member having a pull tab on said locking tooth.

* * * * *